United States Patent [19]
Rhodes et al.

[11] Patent Number: 5,249,872
[45] Date of Patent: Oct. 5, 1993

[54] SPRING LOADED BEARING RETAINER

[75] Inventors: Jerry P. Rhodes, Paris, France; John C. Bigler, Glen Gardner, N.J.

[73] Assignee: The Torrington Company, Torrington, Conn.

[21] Appl. No.: 969,684

[22] Filed: Oct. 30, 1992

[51] Int. Cl.⁵ ............................................. F16C 33/46
[52] U.S. Cl. .................................. 384/574; 384/579
[58] Field of Search .............. 384/579, 526, 574, 581, 384/535

[56] References Cited

U.S. PATENT DOCUMENTS

| | | |
|---|---|---|
| 642,704 | 2/1900 | Miller . |
| 821,703 | 5/1906 | Conrad ........................... 384/526 |
| 824,847 | 7/1906 | Conrad ........................... 384/526 |
| 3,219,399 | 11/1965 | Smith . |
| 3,307,891 | 3/1967 | Carullo . |
| 3,620,583 | 11/1971 | Koprowski . |
| 3,790,240 | 2/1974 | Pitner . |
| 3,976,340 | 8/1976 | Pitner . |
| 4,688,109 | 5/1987 | Basso . |
| 4,732,495 | 3/1988 | Brandenstein et al. . |
| 5,061,089 | 10/1991 | Bair et al. . |

Primary Examiner—Lenard A. Footland

[57] ABSTRACT

A bearing retainer subassembly for use between inner and outer bearing races of a rolling element bearing comprises rolling elements, a bearing retainer, and biasing elements within the bearing retainer for biasing the rolling elements toward one of the inner and outer bearing races to extend a zone of contact between the rolling elements and said one bearing race. The biasing elements may be compression springs, finger springs or similar devices and spacers for applying force on the rolling elements or on aligning pins penetrating the rolling elements to move the rolling elements.

18 Claims, 4 Drawing Sheets

SPRING LOADED BEARING RETAINER

BACKGROUND OF THE INVENTION

This invention relates generally to large bearings with rolling elements and, more particularly, to bearing retainers for rolling element bearings operated at very low rotational speeds.

A bearing retainer in a rolling element bearing serves to separate and align the rolling elements and may also restrict radial movement of the rolling elements. If the bearing retainer restricts the rolling elements in both radial directions, the bearing retainer is also known as a bearing "cage." In large bearings with rolling elements, i.e., bearings having a diameter greater than 0.5 meters, the bearing retainer is made very rugged for reliable service and to sustain loads during lifting that is required for installation and removal of the bearing retainer and rolling elements.

Surface damage commonly occurs in large bearings with spherical, tapered and cylindrical rolling elements that are operated at very low rotational speeds. Due to lack of sufficient centrifugal loading to maintain spin velocity of rolling elements, rolling elements slide or skid against the outer raceway of the bearing during part of their orbit of the bearing. Specifically, centrifugal loading is not adequate to assist in the separation of the surfaces with hydrodynamic or elastrohydrodynamic films. Such surface damage may act as points of initiation of fatigue cracks and may severely limit the service life of bearing components.

Another problem occurs because these large bearings are typically mounted with loose or transition fits when installed in large equipment. In addition, radial internal clearance within the bearings is often desired in such applications to provide ease of installation of bearing elements and to accommodate expected thermal differentials. As a result of these clearances, the rolling elements of the bearings are loaded for only a portion of their orbit of the bearing. Frictional forces within the bearing and lack of traction of the rolling elements due to normal load at the raceway contact cause the rolling elements to lose spin velocity, resulting in surface damage when raceway contact is reestablished.

Previous proposals to reduce such surface damage have focused primarily on improved lubrication. For example, various coatings for the retaining pins have been proposed to reduce drag between the retaining pins and the rolling elements. Other proposals have attempted to improve lubricant entry to the rolling elements, have suggested special treatment of bearing raceways and rolling elements to reduce wear, or have considered use of small clearances and traction fluids. However, none of these proposals has been successful in solving the underlying problem.

The foregoing illustrates limitations known to exist in present bearing retainers for large bearings with rolling elements. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a spring loaded bearing retainer subassembly for use between inner and outer bearing races of a rolling element bearing. The subassembly comprises rolling elements, a bearing retainer, and biasing means within the bearing retainer for biasing the rolling elements toward one of the inner and outer bearing races to extend a zone of contact between the rolling elements and said one bearing race.

The foregoing and other aspects of the invention will be apparent from the following detailed description of the invention when considered with the accompanying drawing figures.

BRIEF DESCRIPTION OF THE DRAWING FIGURES

In this specification, identical elements in different embodiments are given identical reference characters.

DETAILED DESCRIPTION

The bearing retainer of the present invention utilizes a precision spacer that is spring loaded to generate a nominal radial force against a rolling element, so that a tractive effort turns the rolling element outside the usual zone of contact, or "load zone" area, of the bearing.

Figure 1:
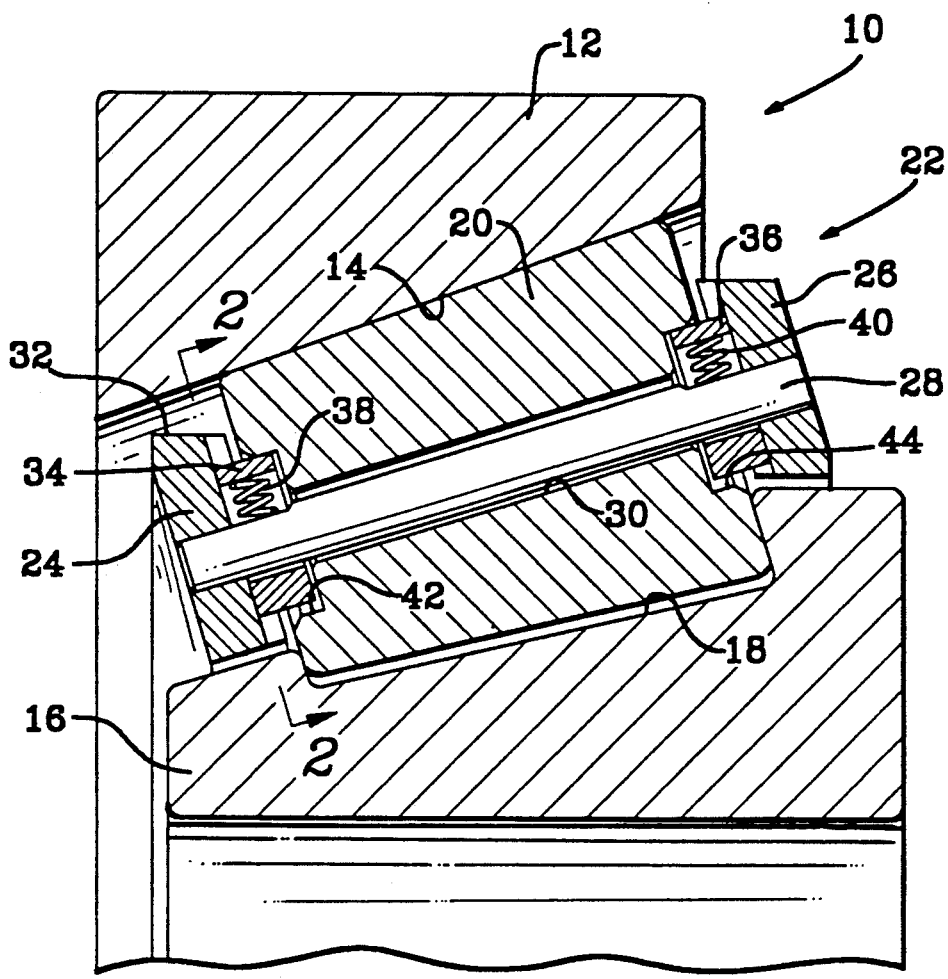
FIG. 1 is a partial cross sectional view of a rolling element bearing illustrating one embodiment of spring loaded bearing retainer of the present invention.
Figure 2:
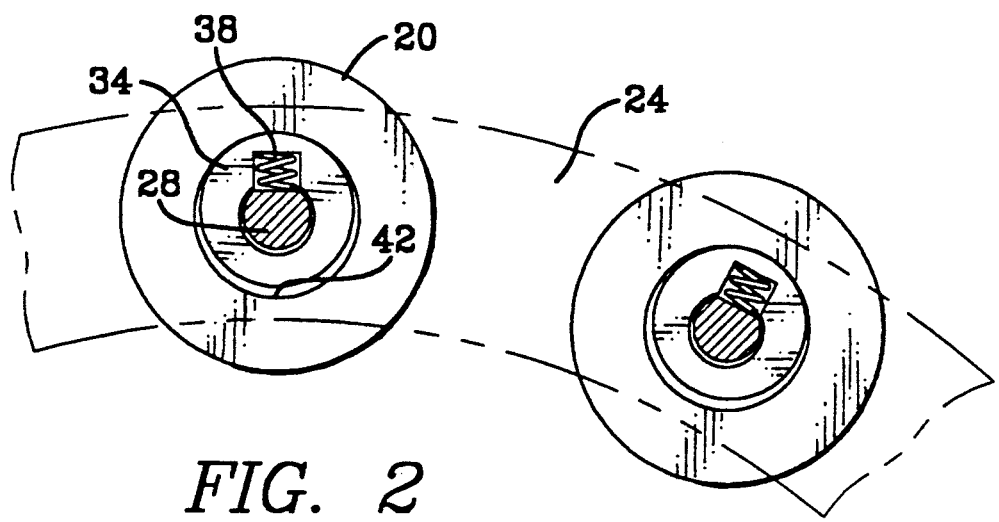
FIG. 2 is a partial sectional view of the spring loaded bearing retainer and rolling element bearing of FIG. 1, taken along the line 2—2 of FIG. 1.

Referring now to the drawings, FIGS. 1 and 2 illustrate a rolling element bearing 10 having an outer race (cup) 12 with outer raceway 14, an inner race (cone) 16 with inner raceway 18, and rolling elements 20 within an annulus between inner and outer raceways 14 and 18. Although rolling elements 20 are of tapered roller configuration as illustrated in FIG. 1, rolling elements 20 could alternatively be spherical or cylindrical. Rolling element bearing 10 also includes a bearing retainer 22.

Bearing retainer 22 includes a first cage ring 24, second cage ring 26, and retaining pins 28 joining first and second cage rings 24 and 26 at regular intervals along their circumference. Rolling elements 20 have a bore 30 along their axes within which retaining pins 28 are received to align, guide and retain rolling elements 20. Ends of retaining pins 28 are mounted within first and second cage rings 24 and 26 by press-fit, welding, staking or other means. First and second cage rings 24 and 26 are substantially flat (or cone shaped) within a plane normal to the axes of rolling elements 20 and may also be angled at surfaces 32, for example, to provide desired clearances.

Unlike typical pin-type bearing retainers, bearing retainer 22 includes first and second spacers 34 and 36 providing an axial space between rolling elements 20 and first and second cage rings 24 and 26, respectively. First and second spacers 34 and 36 are biased radially outwardly by compression springs 38 and 40 to apply a radial load to rolling elements 20 at rolling element counterbore surfaces 42 and 44. Appropriate known manufacturing methods and materials are selected to minimize frictional drag at counterbore surfaces 42 and 44. Compression springs 38 and 40 are selected with spring rates to allow tractive effort to spin rolling elements 20.

Radially outward "sides" of ends of retaining pins 28 ar flat to serve as seats for compression springs 38 and 40 and to prevent rotation of compression springs 38 and 40 and spacers 34 and 36 with respect to retaining pins 28. Clearances are provided between rolling elements 20 and retaining pins 28, and between rolling elements 20 and spacers 34 and 36, to permit radially outward movement of rolling elements 20 to contact outer raceway 14. Compression springs 38 and 40 are confined by first and second cage rings 24 and 26 and by first and second spacers 34 and 36, as illustrated in FIGS. 1 and 2, respectively.

Figure 3:
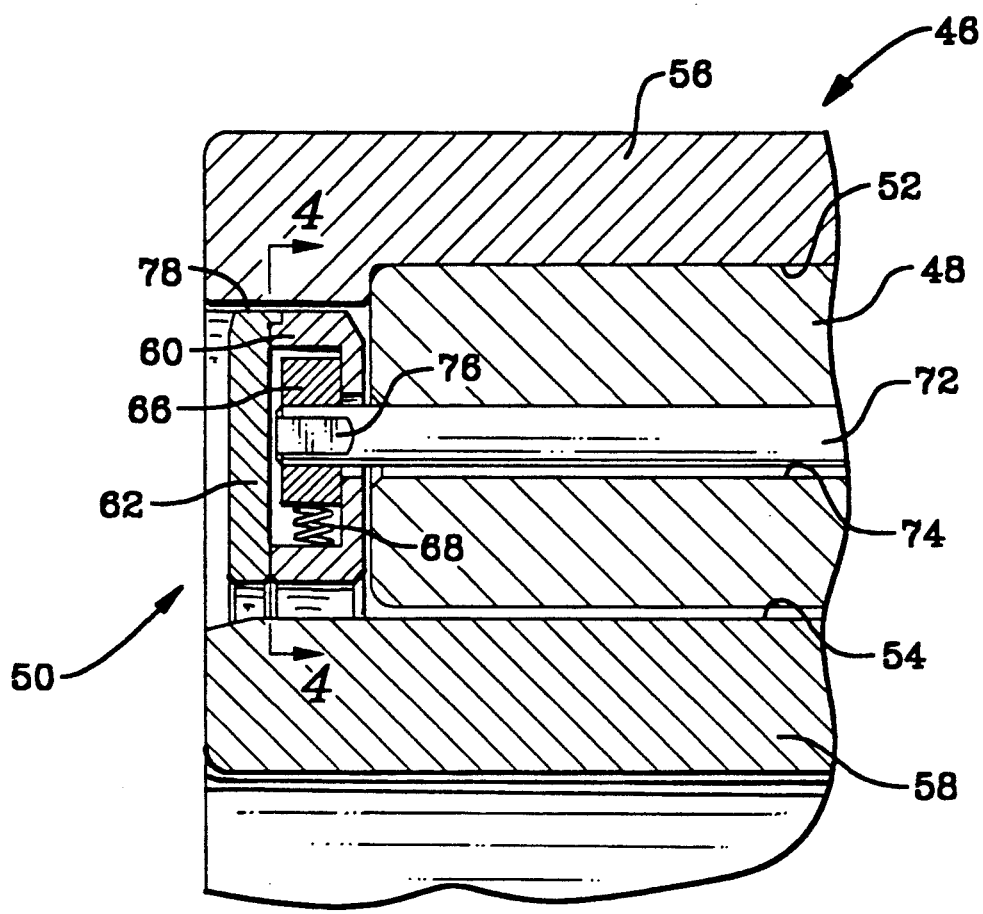
FIG. 3 is a partial cross sectional view of a rolling element bearing illustrating a second embodiment of spring loaded bearing retainer of the present invention.
Figure 4:
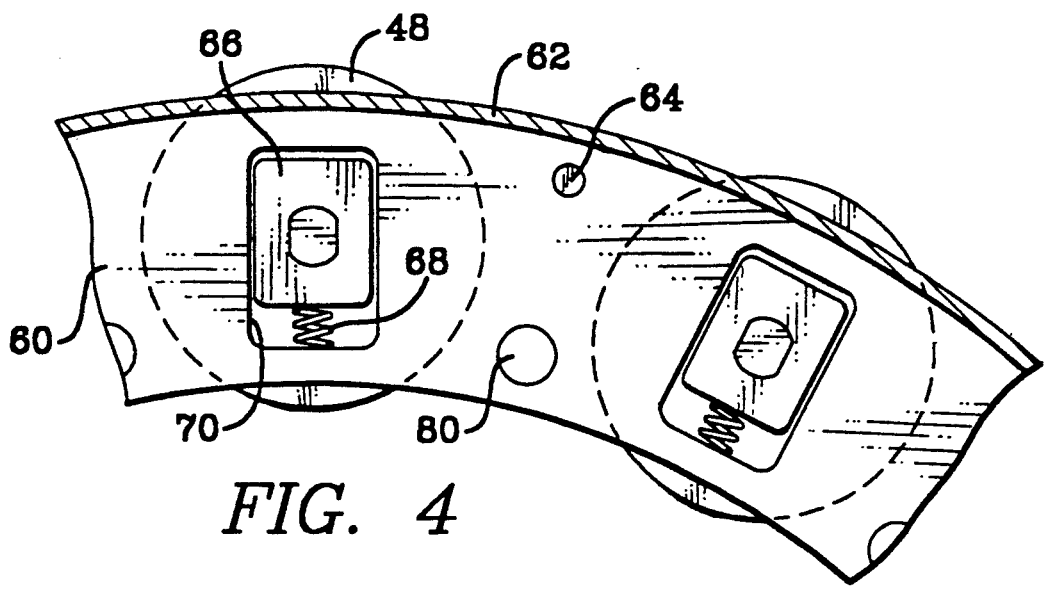
FIG. 4 is a partial sectional view of the spring loaded bearing retainer and rolling elements of FIG. 3, taken along the line 4—4 of FIG. 3.

FIGS. 3 and 4 illustrate a second embodiment of the present invention within a rolling element bearing 46. Cylindrical rolling elements 48 are positioned by a multi-piece bearing retainer 50 between outer and inner raceways 52 and 54 of outer and inner races 56 and 58, respectively. Alternatively, rolling elements 48 may be spherical or tapered. Bearing retainer 50 comprises cage ring 60 and end plate 62 which are joined by rivets or retaining bolts 64, by welding, or by other appropriate means. Spacers 66 are housed by cage ring 60 and end plate 62 and are biased radially outwardly by compression springs 68.

As shown in FIG. 4, spacers 66 are substantially square and are received within elongated openings 70 within cage ring 60 to permit radially outward movement of spacers 66. "Free floating" retaining pins 72 are received within rolling element bores 74 such that clearance allows radially outward movement thereof. Flat areas 76 along "sides" and near ends of retaining pins 72 are mounted within spacers 66 by press-fit, staking or other means. Flat areas 76 also provide a keying action between retaining pins 72 and spacers 66 to prevent rotation of retaining pins 72 with rolling elements 48.

Compression springs 68 are confined by cage ring 60 and end spacers 62 in one direction, and by elongated openings 70 within cage ring 60 in the other direction, as illustrated in FIGS. 3 and 4, respectively. Additional means for installation, constraint and alignment of compression springs 68 may be provided, such as, for example, recesses within cage ring 60 or spacers 66, projections or flanges on cage ring 60 or spacers 66, or aligning pins located within compression springs 68. As with the first embodiment, manufacturing methods and materials and spring rates are selected to minimize frictional drag and allow tractive effort to spin rolling elements 48.

Clearances are sufficient to permit retaining pins 72 to move rolling elements 48 radially outwardly in response to outward biasing of spacers 66 by compression springs 68. FIG. 3 shows only one side of rolling element bearing 46 and bearing retainer 50 since the bearing and retainer are symmetrical, each side being a mirror image of the other. End plate 62 may be formed of two pieces, a substantially flat radially inward portion and a separate end cap providing flange portion 78 to key and interlock cage ring 60. Lift holes 80 may be provided within end plate 62 to facilitate lifting bearing retainer 50 when loaded with rolling elements 48.

Figure 5:
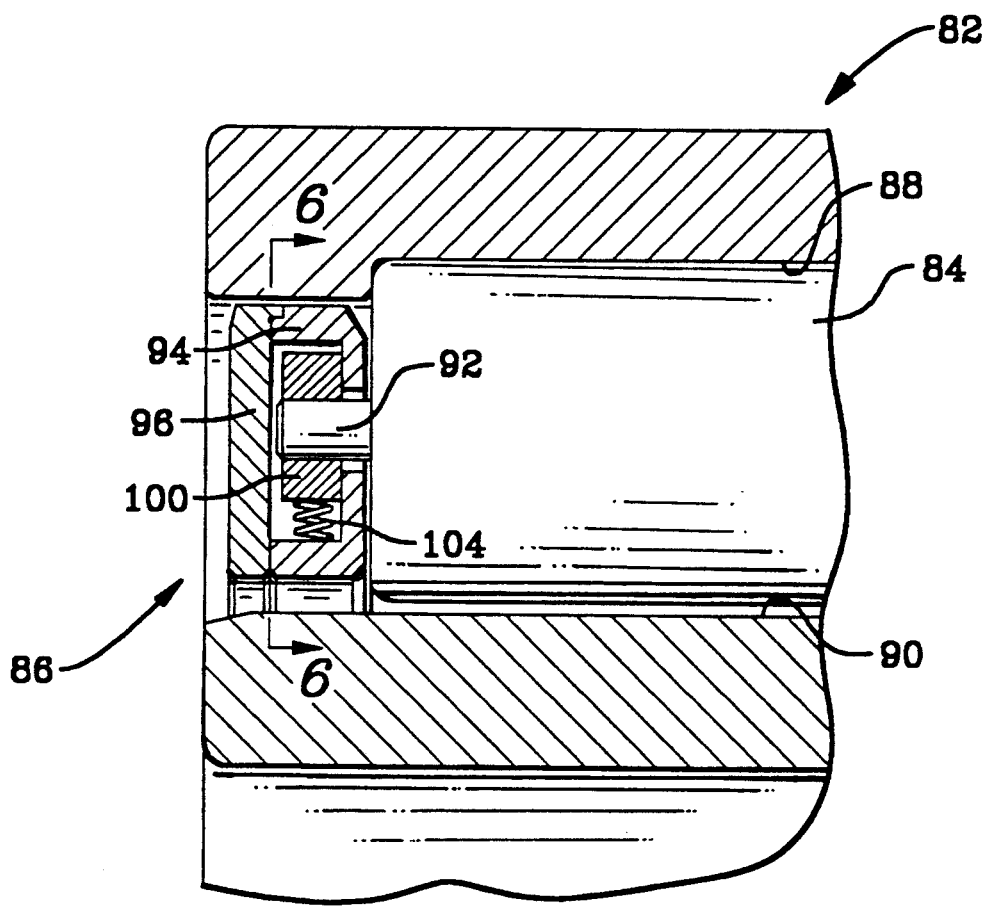
FIG. 5 is a partial cross sectional view of a rolling element bearing illustrating a third embodiment of spring loaded bearing retainer of the present invention.
Figure 6:
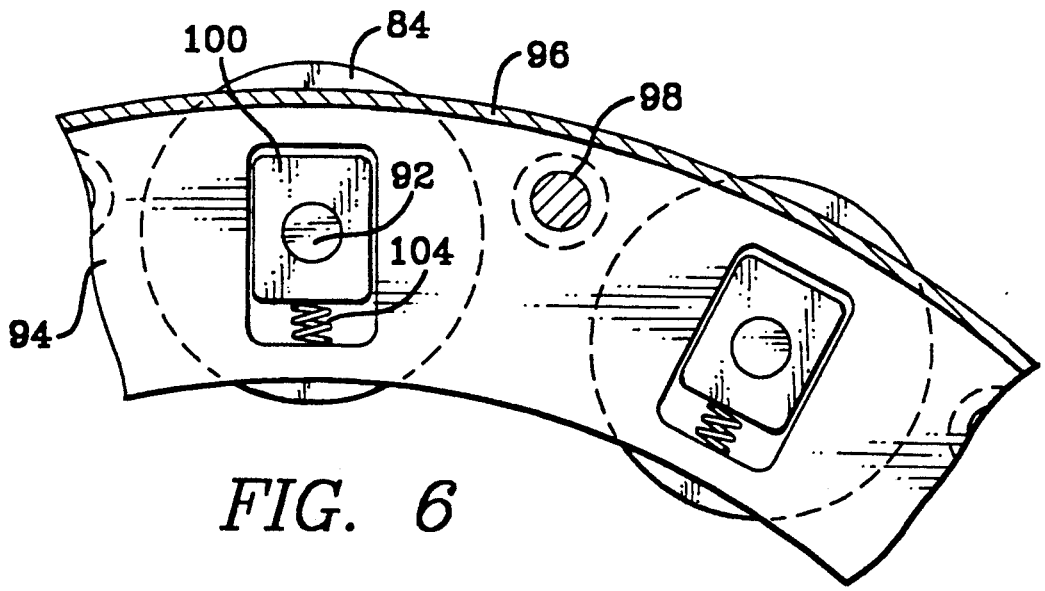
FIG. 6 is a partial sectional view of the spring loaded bearing retainer and rolling elements of FIG. 5, taken along the line 6—6 of FIG. 5.

For some applications where very high loads are supported by the rolling element bearing at very low rotational speeds, rolling mills and continuous casters, for example, apertured rolling elements as illustrated in FIGS. 1 through 4 may not be considered desirable. In such applications, a variation of the above embodiments may be employed, for example, as illustrated within rolling element bearing 82 of FIGS. 5 and 6.

In this third embodiment, rolling elements 84 are positioned by a multi-piece bearing retainer 86 between outer and inner raceways 88 and 90, respectively. Rolling elements 84 have trunnion ends 92 and no bores, in contrast to rolling elements 20 and 48 of the first and second embodiments. Bearing retainer 86 comprises cage ring 94 and end plate 96 which are joined by crossbars 98. "Spacers" 100 are housed and guided by cage ring 94 and end plate 96 in a manner similar to that of the second embodiment. Spacers 100 are substantially square and are received in elongated openings 102 of cage ring 94 to permit their radially outward movement.

Similar to the first embodiment, spacers 100 of the third embodiment are biased radially outwardly by compression springs 104 against rotating trunnion ends 92, rather than against non-rotating retaining pins. Again, manufacturing methods and materials and spring rates are selected to minimize frictional drag and allow tractive effort to spin rolling elements 84 by contact with outer raceways 88. Compression springs 104 are confined between cage ring 94 and end plate 96 by elongated openings 102 and may be confined by additional installation, constraint and alignment means as described above with respect to the second embodiment.

Figure 7:
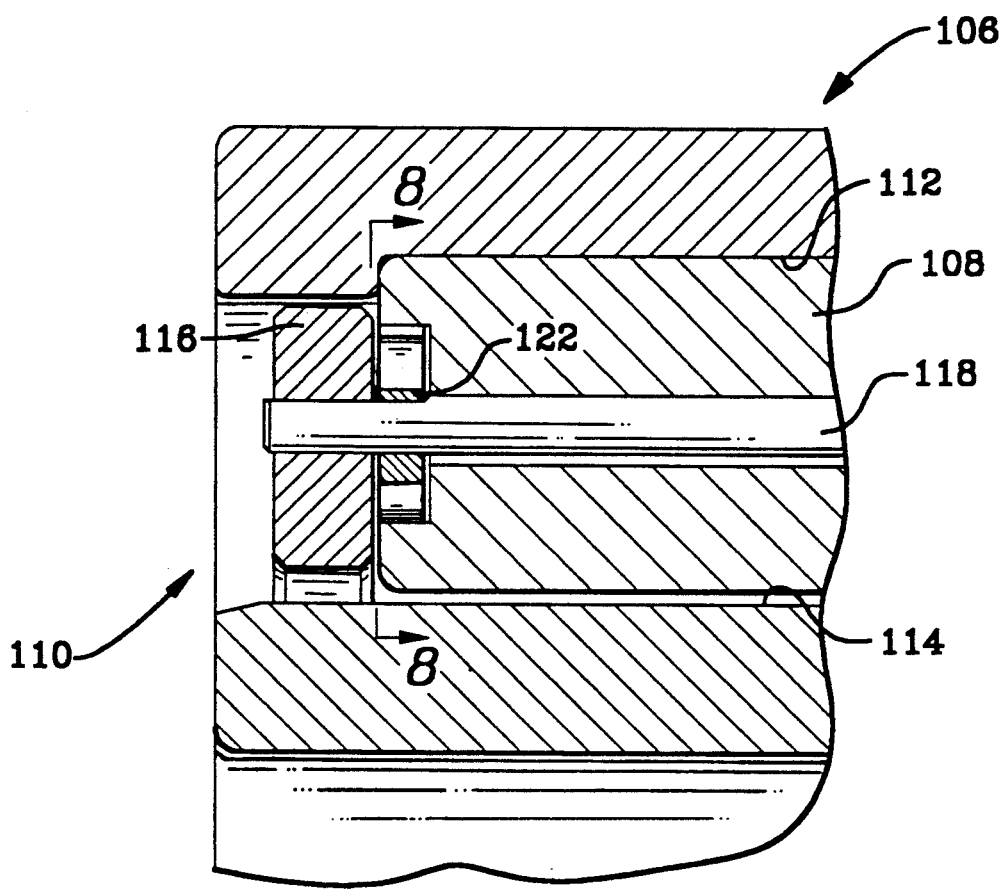
FIG. 7 is a partial cross sectional view of a rolling element bearing illustrating a fourth embodiment of spring loaded bearing retainer of the present invention.
Figure 8:
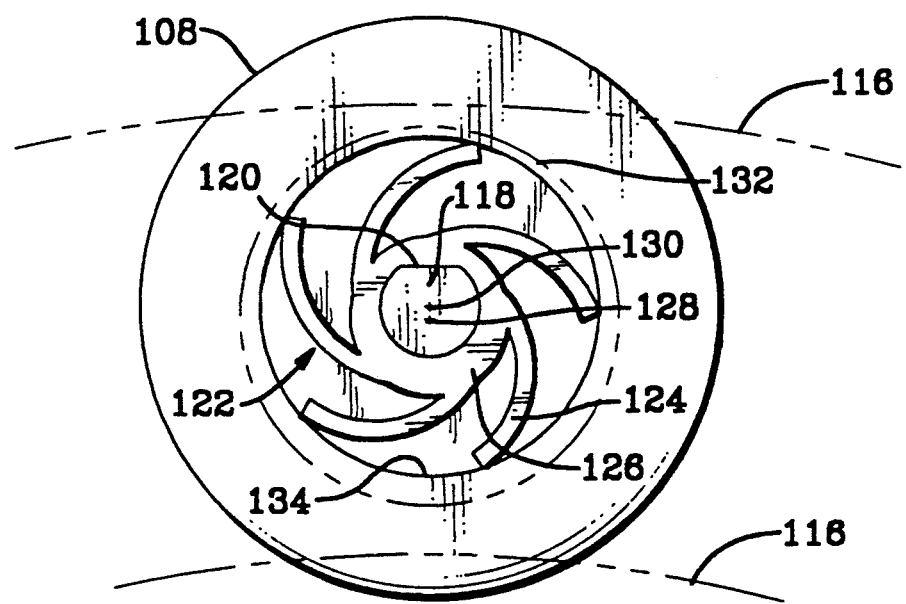
FIG. 8 is an enlarged partial sectional view of the spring loaded bearing retainer and rolling elements of FIG. 7, taken along the line 8—8 of FIG. 7.

FIGS. 7 and 8 illustrate a variation of the embodiment of FIGS. 1 and 2 which employs finger springs rather than helical coil compression springs for ease of assembly. Rolling element bearing 106 has rolling elements 108 aligned and retained by bearing retainer 110 between outer and inner raceways 112 and 114, respectively Bearing retainer 110 comprises cage rings 116 joined by retaining pins 118, by press-fit, welding, or other convenient means. Retaining pins 118 have flat keyway areas 120 on radially outward "sides" of their end portions for keyed engagement with cage rings 116 and spring assemblies 122.

As illustrated in FIG. 8, spring assemblies 122 have spring fingers 124 projecting from a spring hub 126 having an axis 128 offset radially inwardly (with respect to rolling element bearing 106) from axis 130 of retaining pins 118. Spring fingers 124 have a locus 132 in the unrestrained state which is offset with respect to the axis of rolling elements 108. Spring fingers 124 are confined within counterbore surfaces 134 of rolling elements 108 to bias rolling elements 108 radially outwardly into contact with outer raceway 112. Because of the keyed engagement with retaining pins 118, spring assemblies 122 do not precess as they orbit rolling element bearing 106 and maintain a radially outwardly directed bias.

Each of the above embodiments illustrates a radially outward biasing of rolling elements to extend a zone of contact between the rolling elements and an outer raceway. However, the present invention can also be used to provide radially inward biasing of the rolling elements for particular applications. For example, at very low rotational speed with massive rolling members, the present spring loaded retainer can assist gravitational force to extend a zone of contact with an inner (not outer) raceway. In such applications, centrifugal force on the rolling elements, forcing them radially outwardly, may be less significant and more easily overcome than the gravitational force.

Although the invention has been particularly shown and described with reference to preferred embodiments, it will be understood by those skilled in the art that the foregoing and other changes in form and details may be made therein without departing from the spirit and scope of the invention, as defined by the claims appended hereto. For example, other types of springs and other biasing means may be employed.

Having described the invention, what is claimed is:

1. A rolling element bearing assembly comprising:
    an inner bearing race;
    an outer bearing race coaxial with the inner bearing race;
    apertured rolling elements within an annulus between the inner and outer bearing races;
    a bearing retainer having retaining pins, the retaining pins being received within apertures of the rolling elements; and
    biasing means within the bearing retainer for biasing the retaining pins radially to move the rolling elements toward one of the inner and outer bearing races to extend a zone of contact between the rolling elements and said one bearing race.

2. The rolling element bearing assembly according to claim 1, wherein the bearing retainer further comprises cage rings and spacers, the spacers being between the cage rings and the rolling elements, the ends of the retaining pins being fixed to the cage rings, the spacers being keyed to the retaining pins to limit rotation therebetween.

3. The rolling element bearing assembly according to claim 2, wherein the biasing means comprises a spring within at least one spacer, the spring applying a force between the respective retaining pin and the respective spacer.

4. The rolling element bearing assembly according to claim 2, wherein each of the spacers is round and is engageable with a counterbore of the rolling elements.

5. The rolling element bearing assembly according to claim 2, wherein the biasing means comprises at least one spring within each of the spacers applying a force directly to a counterbore of the rolling elements.

6. The rolling element bearing assembly according to claim 5, wherein the springs within the spacers are finger springs projecting from a spring hub, the axis of the spring hub being offset from the axis of the respective retaining pin.

7. The rolling element bearing assembly according to claim 1, wherein the bearing retainer further comprises cage rings and spacers, the ends of the retaining pins being fixed to the spacers, the spacers being keyed to the retaining pins to limit rotation therebetween.

8. The rolling element bearing assembly according to claim 1, wherein the spacers are substantially square and are housed within elongated openings in the bearing retainer.

9. A subassembly for use between inner and outer bearing races of a rolling element bearing, the subassembly comprising:
    apertured rolling elements; and
    a bearing retainer having retaining pins, the retaining pins being received within apertures of the rolling elements; and
    biasing means within the bearing retainer for biasing the retaining pins radially to move the rolling elements toward one of the inner and outer bearing races to extend a zone of contact between the rolling elements and said one bearing race.

10. The subassembly according to claim 9, wherein the bearing retainer further comprises cage rings and spacers, the spacers being between the cage rings and the rolling elements, the ends of the retaining pins being fixed to the cage rings, the spacers being keyed to the retaining pins to limit rotation therebetween.

11. The subassembly according to claim 10, wherein the biasing means comprises a spring within at least one spacer, the spring applying a force between the respective retaining pin and the respective spacer.

12. The subassembly according to claim 10, wherein each of the spacers is round and is engageable with a counterbore of the rolling elements.

13. The subassembly according to claim 10, wherein the biasing means comprises at least one spring within each of the spacers applying a force to a counterbore of the rolling elements.

14. The subassembly according to claim 13, wherein the springs within the spacers are finger springs projecting from a spring hub, the axis of the spring hub being offset from the axis of the respective retaining pin.

15. The subassembly according to claim 9, wherein the bearing retainer further comprises cage rings and spacers, the ends of the retaining pins being fixed to the spacers, the spacers being keyed to the retaining pins to limit rotation therebetween while permitting radial movement of the spacers with respect to the axis of the rolling element bearing.

16. The subassembly according to claim 9, wherein the spacers are substantially square and are housed within an elongated opening in the bearing retainer.

17. A rolling element bearing assembly comprising:
    an inner bearing race;
    an outer bearing race coaxial with the inner bearing race;
    rolling elements within an annulus between the inner and outer bearing races;
    a bearing retainer; and
    biasing means within the bearing retainer for biasing the rolling elements radially toward one of the inner and outer bearing races to extend a zone of contact between the rolling elements and said one bearing race;
    wherein the rolling elements are apertured and wherein the bearing retainer includes retaining pins received within apertures of the rolling elements.

18. A subassembly for use between inner and outer bearing races of a rolling element bearing, the subassembly comprising:
    rolling elements;
    a bearing retainer; and
    biasing means within the bearing retainer for biasing the rolling elements toward one of the inner and outer bearing races to extend a zone of contact between the rolling elements and said one bearing race;
    wherein the rolling elements are aperture and wherein the bearing retainer includes retaining pins received within apertures of the rolling elements.

* * * * *